United States Patent
Newstead

[11] 3,762,510
[45] Oct. 2, 1973

[54] AUTOMATIC ADJUSTERS FOR INTERNAL SHOE VEHICLE WHEEL DRUM BRAKES

[75] Inventor: Charles Newstead, Tyseley, England

[73] Assignee: Girling Limited, Birmingham, England

[22] Filed: Oct. 5, 1971

[21] Appl. No.: 186,665

[30] Foreign Application Priority Data
Oct. 6, 1970  Great Britain............... 47,441/70

[52] U.S. Cl. ................. 188/79.5 P, 188/196 BA
[51] Int. Cl. ........................................ F16d 65/56
[58] Field of Search............. 188/79.5 GE, 79.5 GC, 188/79.5 GT, 79.5 K, 79.5 P, 196 F, 196 BA

[56] References Cited
UNITED STATES PATENTS

| | | |
|---|---|---|
| 2,002,139 | 5/1935 | Des Rosiers................ 188/79.5 M |
| 2,287,238 | 6/1942 | Goepfrich.................. 188/79.5 GC |
| 2,978,072 | 4/1961 | Burnett..................... 188/79.5 GC |
| 3,131,787 | 5/1964 | Swift........................ 188/79.5 GC |
| 3,464,525 | 9/1969 | Newstead................ 188/196 BA X |

*Primary Examiner*—Duane A. Reger
*Attorney*—Samuel Scrivener, Jr. et al.

[57] ABSTRACT

An adjustable abutment assembly for a drum brake having a rotatable adjuster member parallel with the backing plate. A means to store signals representing a predetermined movement of the shoes, and a control means is responsive to the stored signals to effect rotation of the adjuster. The signal storing means includes a rotatable cam rotated by a pawl and ratchet, and the control means includes a pawl and ratchet controlled by the cam to effect adjustment when the cam is rotated.

9 Claims, 7 Drawing Figures

AUTOMATIC ADJUSTERS FOR INTERNAL SHOE VEHICLE WHEEL DRUM BRAKES

The invention relates to adjustable abutment assemblies for internal shoe vehicle wheel drum brakes.

The invention provides an adjustable abutment assembly for an internal shoe vehicle wheel drum brake including a rotatable adjuster member arranged substantially parallel with the back plate of the brake, means to store signals each representative of a predetermined minimum movement of the brake shoes and control means responsive to the stored signals operable to effect rotation of the adjuster member and adjust the assembly.

Preferably said signal storing means comprise rotatable cam means arranged to be rotated by a first pawl and ratchet device in response to a predetermined movement of the brake shoes, and said control means comprise a second pawl and ratchet device controlled by the cam means to effect adjustment of the abutment assembly when the rotatable cam means is rotated a predetermined amount.

One form of adjustable abutment assembly according to the invention will now be described, by way of example with reference to the accompanying drawings in which:-

Figure 1:
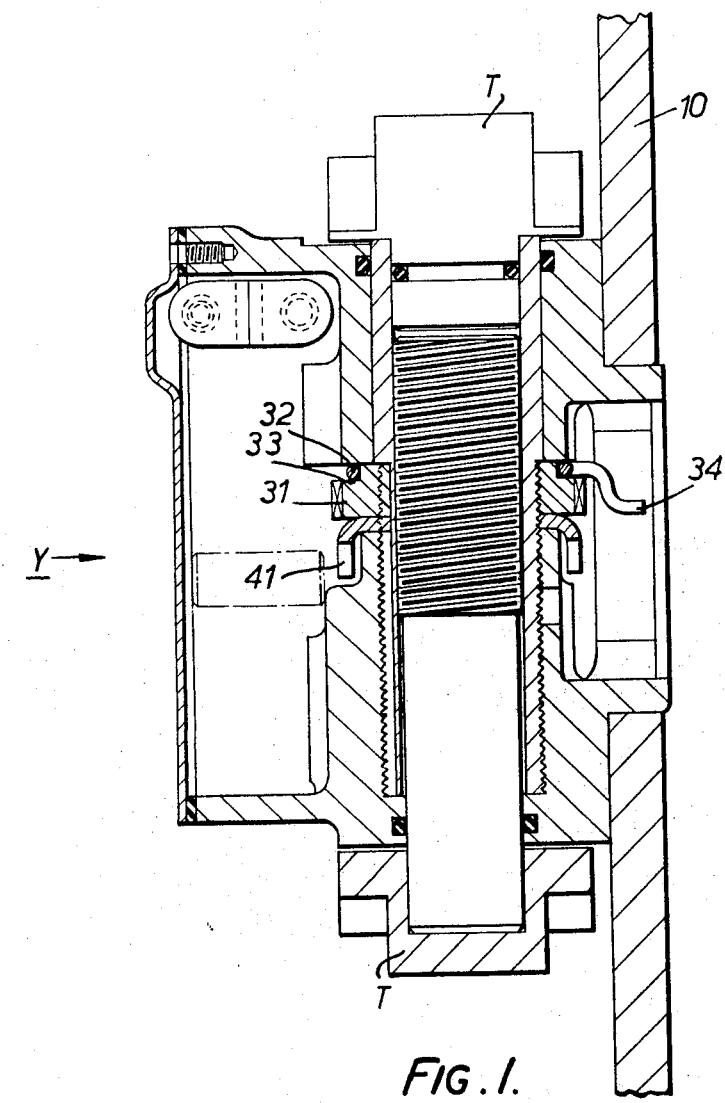
FIG. 1 is an axial cross section taken perpendicular to a brake back plate through an adjustable abutment assembly.

The adjustable abutment assembly shown in FIG. 1 is mounted on a drum brake back plate 10 between the ends of a pair of brake shoes (not shown) which abut tappets T. The brakes are actuated by any suitable form of actuator, and the brake shoe movements are transmitted to the abutment assembly by a sheathed cable 11 from a suitable transmitter which transmits a distinct signal upon each brake shoe movement.

The sheathed cable 11 (FIG. 2) has the sheath connected to a housing 12 and the cable pivotally connected to a lever 13 by a U-shaped link and nipple arrangement 15. The lever 13 is formed into two arms and is rotatably mounted on a pin 14. The lever 13 is biassed in an anti-clockwise direction by a tension spring 16 which acts between a part of the lever 13 and an inner housing 17 which is made from a flat metal plate by bending it into a housing of generally rectangular shaped cross section. A pawl 50 is pivotally attached to the lever 13 at the same place as the U-shaped link 15 and biassed by a spring 18 into contact with a ratchet wheel 19 mounted on the pin 14.

When the brakes are applied the tension in the cable 11 is released and the lever 13 rotates anti-clockwise, and, if there is excessive movement due to wear of the brake linings, the pawl 50 picks up a new tooth on the ratchet wheel 19. On release of the brakes the pawl 50 rotates the ratchet wheel 19.

Attached to the ratchet wheel 19 so as to be rotated with it, is a cam 20 which is formed in two parts and has two lobes.

Figure 2:
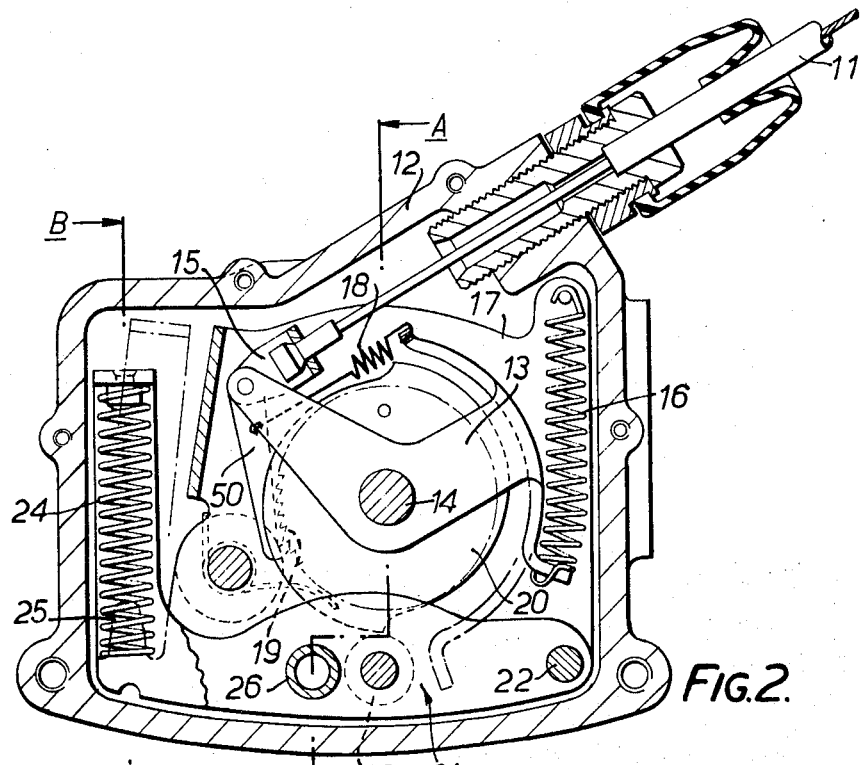
FIG. 2 is a partially sectioned view in the direction of the arrow Y in FIG. 1 with the cover removed.
Figure 3:
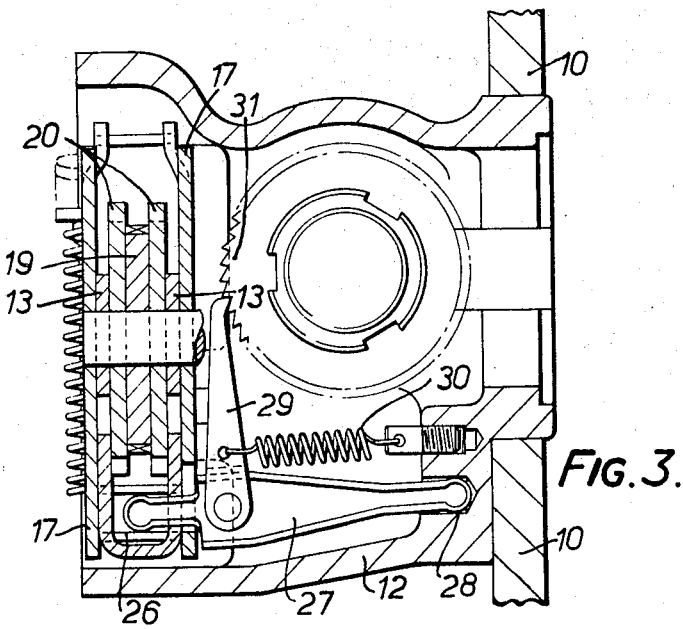
FIG. 3 is a cross section on the line AA of FIG. 2.
Figure 4:
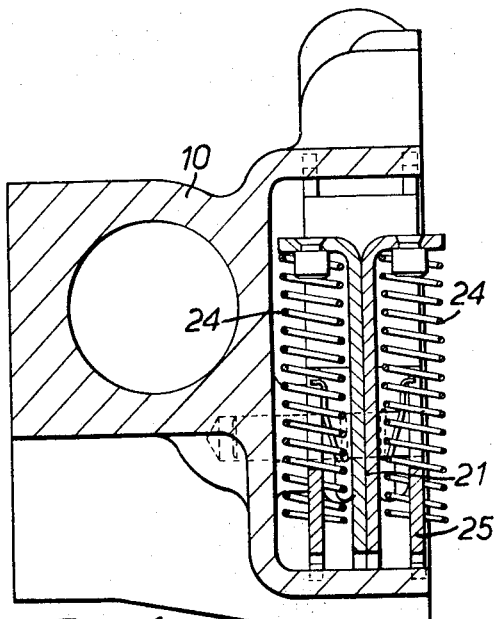
FIG. 4 is a cross section on the line BB of FIG. 2.

An L-shaped lever 21 is pivotally mounted about a pin 22. The lower (as seen in FIG. 2) limb of the L-shaped lever 21 has a U-shaped cross section with a cam roller 23 rotatably mounted between the two limbs of the U-shaped section. The upright (as seen in FIG. 2) limb of the L-shaped lever has a longitudinal T-section (FIG. 4) with two compression springs 24 acting between the T portions and parts 25 of the inner housing 17. These springs 24 bias the L-shaped lever in a clockwise direction so that the cam roller 23 is biassed into contact with the cam 20. As the cam 20 is rotated by the ratchet wheel 19 in a clockwise direction, so the L-shaped lever is moved in an anti-clockwise direction against the action of the compression springs 24. When the cam roller 23 passes over one of the lobes on the cam 20 the L-shaped lever 21 is allowed to rotate clockwise under the action of the springs 24.

The lower limb of the L-shaped lever 21 carries a sleeve 26 between the links of the U-shaped section. A lever 27 having spherical ends has one end inserted in the sleeve 26 and the other end inserted in a bore 28 in the housing 12.

The lever 27 has a pawl 29 pivotally attached to it intermediate its ends. The pawl 29 is biassed by a spring 30 into engagement with a ratchet wheel 31 of a differential thread adjuster. The adjuster is similar in operation to the adjuster described in our U.S. Pat. Specification No. 1152851.

As the cam roller 23 passes over a lobe on the cam 20 and the L-shaped lever moves clockwise, the lever 27 is pivoted about the spherical end in the bore 28 and moves the pawl 29 to rotate the ratchet wheel 31 and effect adjustment of the abutment assembly.

Figure 7:
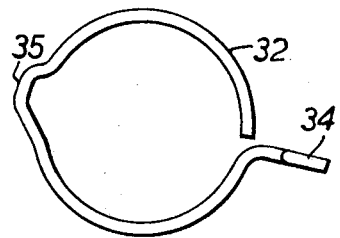
FIG. 7 is a plan view of a wire clip which forms part of the assembly.
Figure 5:
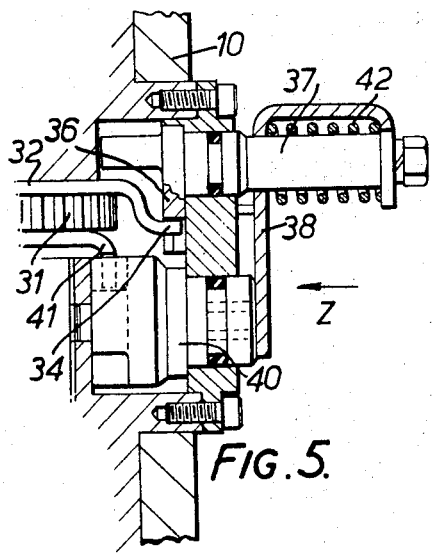
FIG. 5 is an axial cross section as in FIG. 1 of the manual adjusting mechanism which is omitted from FIG. 1.

In order to disengage the pawl 29 from the ratchet wheel 31 to allow manual adjustment of the adjuster, a wire clip 32 (FIG. 7) is mounted around a shoulder 33 on the ratchet wheel 31. This wire clip has a projecting end 34 and a lug portion 35.

On rotation of the clip 32 the lug portion engages the pawl 29 and lifts it out of engagement with the teeth of the ratchet wheel 31.

The projecting end 34 of the wire clip 32 is engaged by a bifurcated member 36 which is attached to, or made integral with, a rotatable spindle 37, which projects through the back plate 10. Also attached to the spindle 37 is a cover 38 having thumb portion for rotating the cover 38 and spindle 37.

Figure 6:
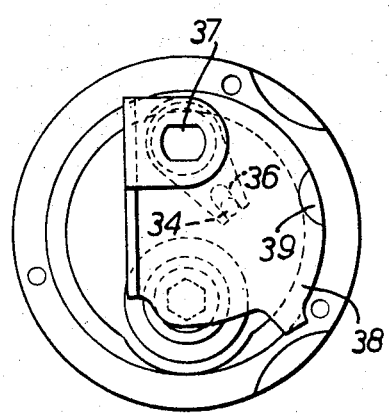
FIG. 6 is a view in the direction of the arrow Z of FIG. 5.

Rotation of the spindle 37 in a clockwise direction (FIG. 6) rotates the wire clip 32 on the shoulder 33 and causes the lug portion 35 to disengage the pawl 29 from the teeth of the ratchet wheel 31. This rotation of the cover 38 brings a recess 39 in the cover into line with a crown wheel 40 so that the crown wheel 40 may be rotated by an allen key or other suitable tool. The crown wheel 40 engages the teeth of a contrate wheel 41 coaxially keyed with the ratchet wheel 31 to the sleeve of the differential thread adjuster, so that rotation of the crown wheel 40 effects manual adjustment of the adjuster. A torsion spring 42 biasses the cover 38 into its closed position with the pawl 29 engaging the teeth of the ratchet wheel 31.

The above described abutment assembly with adjuster mechanism can be manufactured as a cheap efficient unit completely sealed within its housing.

In a vehicle wheel drum brake comprising two lined brake shoes separated at one of their adjacent ends by an adjustable abutment assembly and at their other ends by some form of shoe expander having tappets with inclined ends abutting the shoes, there is a tendency for the shoes to move along the inclined ends of the tappets and this gives rise to a slightly incorrect adjustment signal corresponding to both brake lining wear and to shoe movement along the inclined tappet ends. However in the above described adjustable abutment assembly the signal due to movement of the shoes along the inclined tappet ends merely alters the initial angular position of the lever 13 and the movement of the cam 20 provides an adjusting signal to the pawl 29 dependent of brake lining wear only.

I claim:

1. An adjustable abutment assembly for an internal shoe vehicle wheel drum brake having a back plate and brake shoes movably mounted therein, said assembly comprising a rotary adjuster member parallel with said back plate and operatively associated with said brake shoes, means for transmitting input signals, each representative of a predetermined movement of said brake shoes to said adjuster member, said transmitter means comprising means to store successive signals incrementally; and control means responsive to a predetermined number of stored signals and operable to effect rotation of said adjuster member.

2. An assembly according to claim 1, wherein said signal storing means comprise rotatable cam means; a first pawl and ratchet device operable in response to said input signals to rotate said cam means; a cam roller member; carrier means supporting said cam roller member; and resilient means which store said input signals and which resiliently biasses said carrier means to a position in which said cam roller member engages said cam means, the arrangement being such that said cam roller member is driven by said cam means to load said resilient means incrementally as said cam means are rotated.

3. An assembly according to claim 2, wherein said control means comprise a second pawl and ratchet device coupled to said carrier means and being operable by said resilient means to rotate said adjuster member when said cam means are rotated a predetermined amount.

4. An assembly according to claim 3, wherein said control means further comprise an intermediate member coupled to said carrier means and having pivotally connected to said second pawl, and a second resilient means biassing said second pawl into engagement with said second ratchet wheel.

5. An assembly according to claim 2, wherein said storing means further comprise a signal transmitting member pivotally coupled to said first pawl; further resilient means biassing said first pawl into engagement with said first ratchet wheel; a pivoted follower means pivotally coupled to said transmitting member and connected to said further resilient biassing means; and other resilient biassing means biassing said pivoted follower means to an inoperative brake off position.

6. An assembly according to claim 5, wherein said cam means comprise two cams and said follower means comprise two follower levers, and wherein said storing means further comprise an internal housing member which houses said first pawl and ratchet device, said cam means and said follower means and said associated further and other resilient biassing means, and a shaft which carries said first ratchet wheel and upon which said cams and follwer levers are symmetrically mounted about said first ratchet wheel,said shaft extending through said inner housing member.

7. An assembly according to claim 3, and including means for manual adjustment of the assembly, wherein said manual adjustment means comprise an adjustment member operable to rotate said second ratchet wheel; a release member operable to move said second pawl out of engagement with said second ratchet wheel; and a rotatable control member coupled to said release member, the arrangement being such that rotation of said control member causes corresponding rotation of said release member to disengage said second pawl from said second wheel, and rotation of said adjustment member causes rotation of said second ratchet wheel to adjust said assembly.

8. An assembly according to claim 7, wherein said manual adjustment means further comprise a contrate wheel concentric with and connected to said second ratchet wheel and wherein said adjustment member is a crown gear wheel which meshes with said contrate wheel, and said release member is a clip mounted around said second ratchet wheel and having a lug portion and a projecting end, said lug portion being movable to engage said second pawl and release the latter from said second ratchet and the control member engaging said projecting end.

9. An assembly according to claim 2, wherein at least said first ratchet wheel has circumferential teeth to minimise frictional forces between the pawl and the ratchet wheel and to obviate twisting forces.

* * * * *